United States Patent
Hsieh et al.

(10) Patent No.: US 11,317,351 B2
(45) Date of Patent: Apr. 26, 2022

(54) ELECTRONIC DEVICE AND METHOD FOR BEAM MANAGEMENT WITH POWER SAVING

(71) Applicant: MEDIATEK INC., Hsinchu (TW)

(72) Inventors: Chi-Hsuan Hsieh, Hsinchu (TW); Wei-De Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 94 days.

(21) Appl. No.: 16/861,924

(22) Filed: Apr. 29, 2020

(65) Prior Publication Data

US 2020/0351790 A1    Nov. 5, 2020

Related U.S. Application Data

(60) Provisional application No. 62/840,473, filed on Apr. 30, 2019.

(51) Int. Cl.
*H04W 52/02* (2009.01)
(52) U.S. Cl.
CPC .............................. *H04W 52/0245* (2013.01)
(58) Field of Classification Search
CPC .................................................. H04W 52/0245
USPC ........................................................ 370/311
See application file for complete search history.

(56) References Cited

U.S. PATENT DOCUMENTS

| 2018/0041936 | A1* | 2/2018 | Kim | H04L 5/0053 |
| 2019/0207722 | A1* | 7/2019 | Gao | H04W 24/10 |
| 2020/0028603 | A1* | 1/2020 | Wang | H04L 5/0051 |

FOREIGN PATENT DOCUMENTS

| WO | WO 2018/085709 A1 | 5/2018 |
| WO | WO 2018/127780 A1 | 7/2018 |

OTHER PUBLICATIONS

International Search Report and Written Opinion dated Jul. 29, 2020 in PCT/CN2020/088224, 9 pages
(Continued)

*Primary Examiner* — Gbemileke J Onamuti
(74) *Attorney, Agent, or Firm* — Oblon, McClelland, Maier & Neustadt, L.L.P.

(57) ABSTRACT

Aspects of the disclosure provide an electronic device including processing circuitry and a method for beam management (BM) with power saving. The processing circuitry can receive a reference signal from a network via a serving beam pair used for downlink (DL) transmission between the network and an electronic device. The serving beam pair can include a serving transmission (Tx) beam transmitted from the network and a serving reception (Rx) beam received by the electronic device. The processing circuitry can determine a signal quality of the reference signal. When the signal quality is determined to satisfy a power saving condition, the processing circuitry can reduce beam measurements in the BM for beam pairs including Tx beams transmitted from the network and respective Rx beams received by the electronic device. The beam pairs can include the serving beam pair and one or more candidate beam pairs.

18 Claims, 5 Drawing Sheets

(56) References Cited

OTHER PUBLICATIONS

"Email Report 105_56—RRM Related Aspects for Power Saving", Ericsson (email rapporteur), 3GPP TSG-RAN2 Meeting #105bis, R2-1904155, Apr. 8-12, 2019, pp. 1-23.
Combined Taiwanese Office Action and Search Report dated Apr. 30, 2021 in Patent Application No. 109114528 (with English translation of Category of Cited Documents), 14 pages
Nokia, et al., "Power consumption reduction in RRM measurements, WID/SID: FS_NR_UE_pow_sav—Release 16," 3GPP TSG-RAN WG2 Meeting #105, R2-1901572, 2019, 9 pages.

* cited by examiner

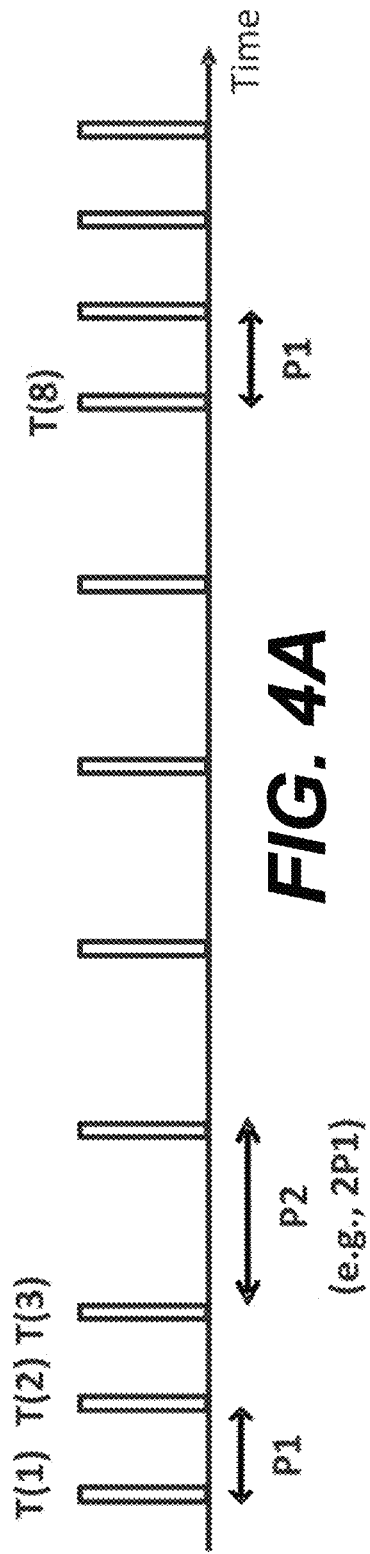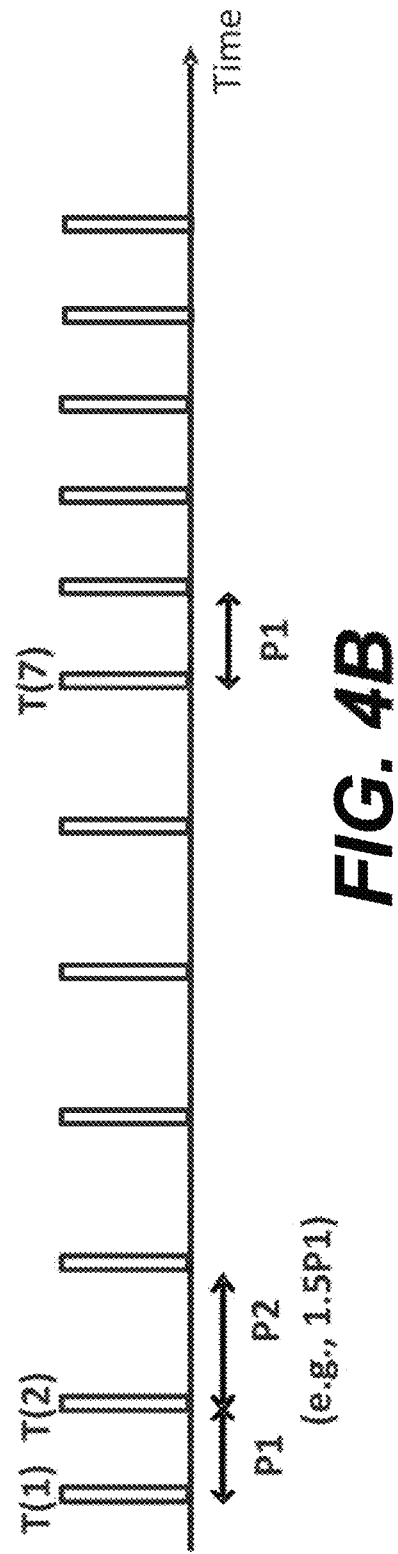

ELECTRONIC DEVICE AND METHOD FOR BEAM MANAGEMENT WITH POWER SAVING

INCORPORATION BY REFERENCE

This present application claims the benefit of priority to U.S. Provisional Application No. 62/840,473, "NR FR2 Beam Management Power Saving" filed on Apr. 30, 2019, which is incorporated by reference herein in its entirety.

TECHNICAL FIELD

The present application relates generally to wireless communication technology including beam management.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Beamformed transmission/reception can be used in 5th Generation (5G) wireless communication systems to increase system capacity. Beam management can be used to form wireless communication links between an electronic device and a network and can consume a large portion of power.

SUMMARY

Aspects of the disclosure provide an electronic device including processing circuitry and a method for beam management (BM) with power saving. The processing circuitry can receive a reference signal from a network via a serving beam pair used for downlink (DL) transmission between the network and an electronic device. The serving beam pair can include a serving transmission (Tx) beam transmitted from the network and a serving reception (Rx) beam received by the electronic device. The processing circuitry can determine a signal quality of the reference signal. When the signal quality is determined to satisfy a power saving condition, the processing circuitry can reduce beam measurements in the BM for beam pairs including Tx beams transmitted from the network and respective Rx beams received by the electronic device. The beam pairs can include the serving beam pair and one or more candidate beam pairs. In an embodiment, the signal quality includes one of: a reference signal received power (RSRP), a signal to noise ratio (SNR), a signal to interference and noise ratio (SINR), and a reference signal received quality (RSRQ). The power saving condition is that the signal quality remains larger than a first quality for a first consecutive number of times. The first quality can be one of: 1) a first threshold and 2) a sum of a second threshold and a candidate signal quality determined based on the one or more candidate beam pairs.

In an embodiment, the processing circuitry can reduce the beam measurements in a spatial domain by performing the beam measurements for a subset of the beam pairs including the serving beam pair, while not performing the beam measurements for a remaining subset of the beam pairs. A number of the subset of the beam pairs is less than a number of the beam pairs. In an example, the reference signal includes a channel-state information reference signal (CSI-RS) or a synchronization signal block (SSB). The beam measurements include periodic layer 1 (L1) RSRP (L1-RSRP) measurements or periodic L1 SINR (L1-SINR) measurements. The processing circuitry can perform the periodic L1-RSRP measurements or the periodic L1-SINR measurements for the subset of the beam pairs.

In an embodiment, the processing circuitry can skip the beam measurements and corresponding beam reporting in a time domain for a second consecutive number of times. In an example, the reference signal includes a CSI-RS or a SSB, the beam measurements include periodic L1-RSRP measurements or periodic L1-SINR measurements. The processing circuitry can skip 1) the periodic L1-RSRP measurements or the periodic L1-SINR measurements and 2) the corresponding beam reporting for the second consecutive number of times.

In an embodiment, the beam measurements include periodic beam measurements; and the processing circuitry can increase a period of the periodic beam measurements and corresponding beam reporting from a first period P1 to a second period P2 that is longer than P1. In an example, the processing circuitry can determine the signal quality of the reference signal when the period is the second period P2. When the signal quality is determined not to be larger than the first quality, the processing circuitry can reduce the period from P2 to P1. In an example, the reference signal includes a CSI-RS or a SSB, and the periodic beam measurements include periodic L1-RSRP measurements or periodic L1-SINR measurements.

In an embodiment, the processing circuitry can measure at least one candidate signal quality based on the one or more candidate beam pairs and determine the candidate signal quality being the largest of the at least one candidate signal quality.

In an embodiment, the processing circuitry can reduce the beam measurements comprises at least one of: 1) reducing the beam measurements in a spatial domain by performing the beam measurements for a subset of the beam pairs including the serving beam pair, while not performing the beam measurements for a remaining subset of the beam pairs, where a number of the subset of the beam pairs is less than a number of the beam pairs; 2) skipping the beam measurements and corresponding beam reporting in a time domain for a second consecutive number of times; and 3) when the beam measurements include periodic beam measurements, increasing a period of the periodic beam measurements and corresponding beam reporting from a first period P1 to a second period P2 that is longer than P1.

BRIEF DESCRIPTION OF THE DRAWINGS

Various embodiments of this disclosure that are proposed as examples will be described in detail with reference to the following figures, wherein like numerals reference like elements, and wherein:

FIGS. 4A-4B show examples of reducing beam measurements in a time domain according to embodiments of the disclosure.

DETAILED DESCRIPTION OF EMBODIMENTS

Figure 1A:
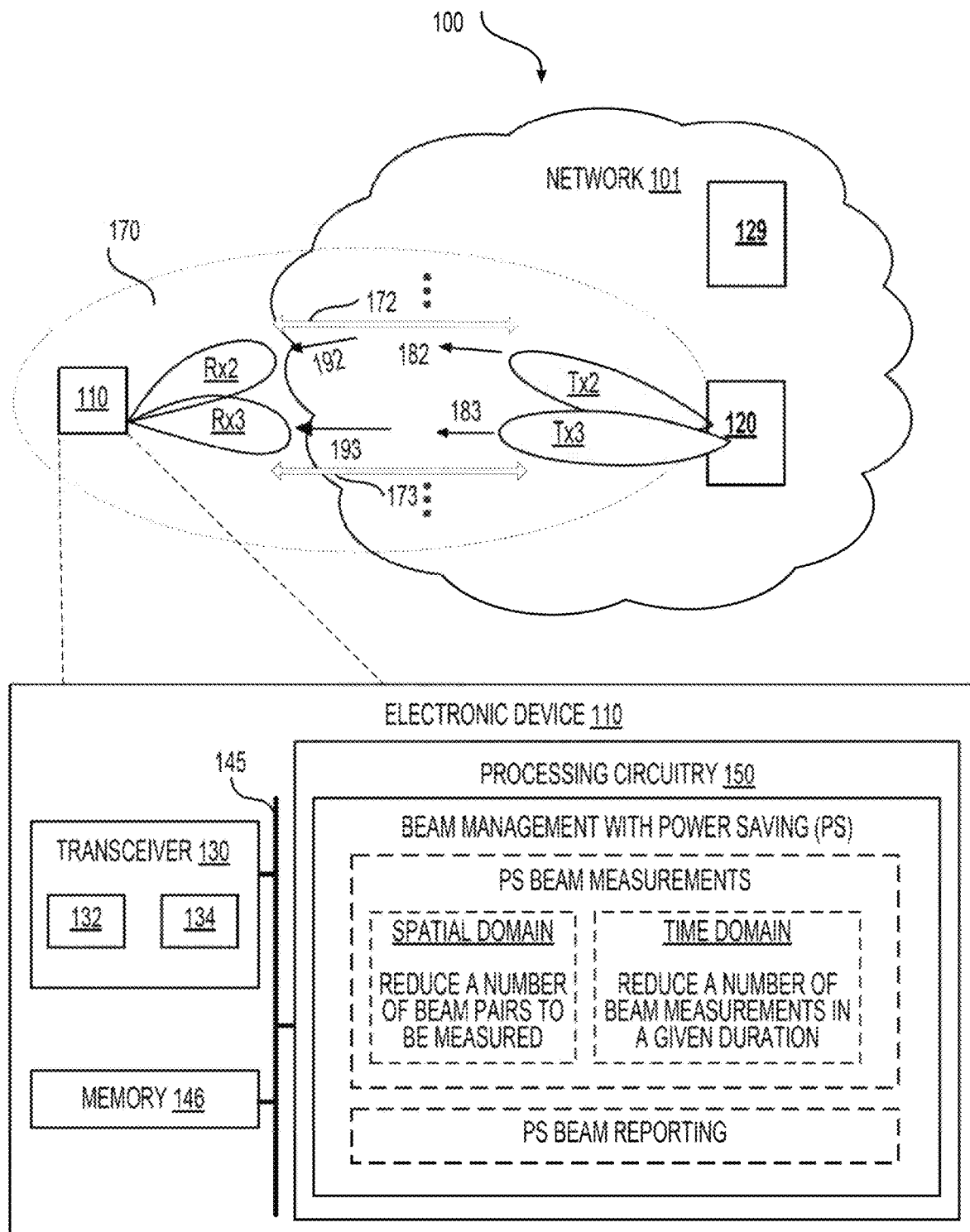
FIG. 1A shows a block diagram of an exemplary communication system 100 according to an embodiment of the disclosure.

FIG. 1A shows a block diagram of an exemplary communication system 100 according to an embodiment of the disclosure. The communication system 100 includes a network 101 and an electronic device 110 that receives wireless communication service from the network 101. The network 101 can include a base station 120. A cell 170 can be formed between the electronic device 110 and the network 101 (e.g., the base station 120) for wireless communication. The network 101 (e.g., the base station 120) and the electronic device 110 can perform beamformed transmission and/or reception in the cell 170. Accordingly, in downlink (DL) communication from the network 101 to the electronic device 110, signal energy of a beam (or transmission (Tx) beam, DL Tx beam) Tx3 can be focused (or transmitted) predominantly toward a specific direction, such as a direction 183, and signal energy can be received predominantly from a specific direction such as a direction 193 associated with a beam (or Rx beam, DL Rx beam) Rx3 of the electronic device 110. A beam pair (or DL beam pair) 173 for the DL communication can include Tx3 and Rx3. In an embodiment, the base pair 173 is used for physical DL control channel (PDCCH), physical DL shared channel (PDCCH), a channel-state information reference signal (CSI-RS) transmission, and/or the like. Thus the beam pair 173 can be referred to as a serving beam pair including serving beams, such as a serving Tx beam (Tx3) and a serving Rx beam (Rx3).

Figure 1B:
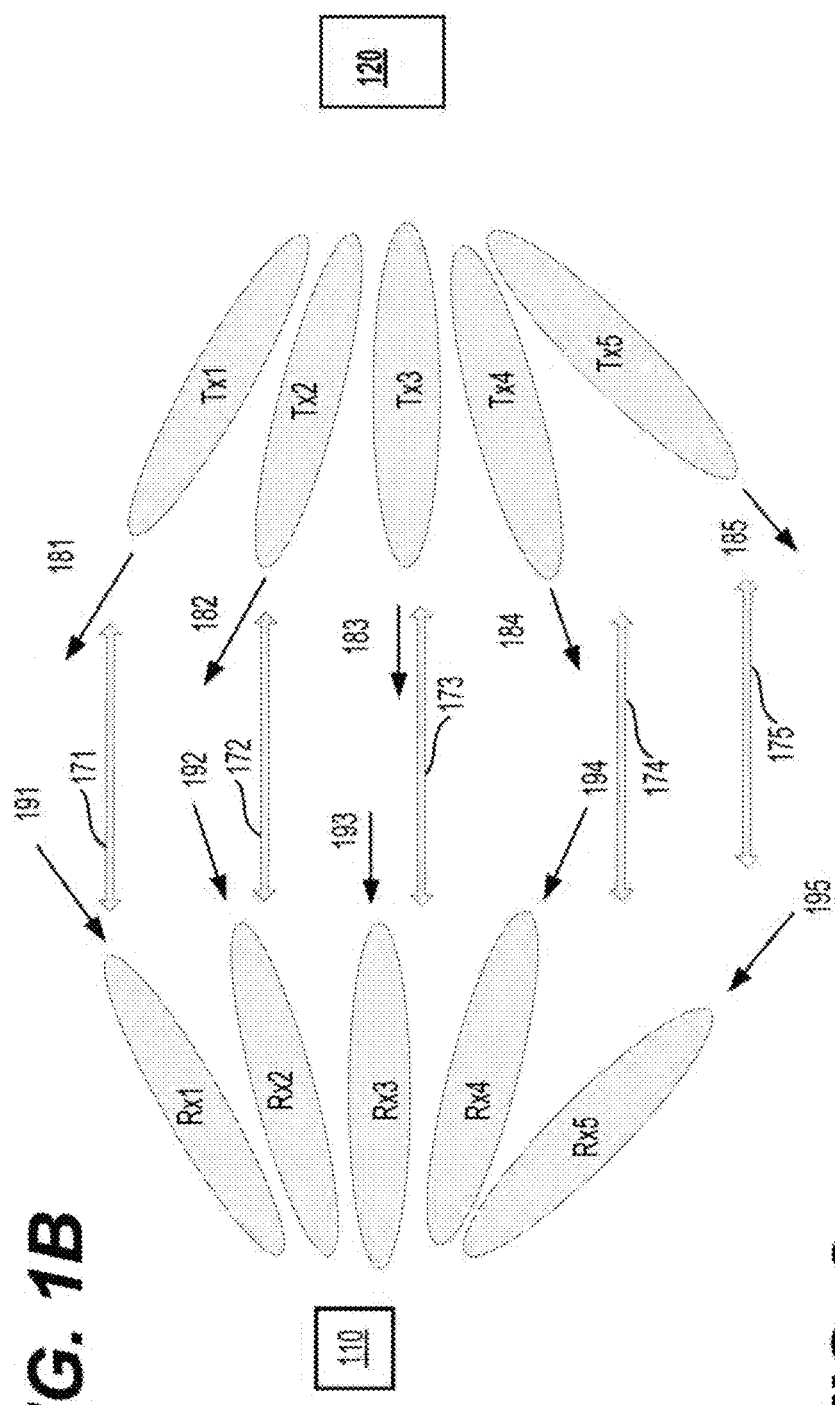
FIG. 1B shows an example of beam pairs according to an embodiment of the disclosure.

The base station 120 can transmit a plurality of Tx beams along respective directions, and the electronic device 110 can receive a plurality of Rx beams along respective directions. Referring to FIGS. 1A-1B, the base station 120 can transmit Tx beams Tx1-Tx5 along directions 181-185, respectively, for example, using beam sweeping. The electronic device 110 can receive Rx beams Rx1-Rx5 along directions 191-195, respectively.

In general, beam management (BM), e.g., a set of procedures to acquire and maintain a set of Tx (e.g., Tx1-Tx5) and Rx (e.g., Rx1-Rx5) beams or beam pairs (e.g., beam pairs 171-175) can be implemented to form and maintain a suitable link (e.g., the serving beam pair 173) between the network 101 (e.g., the base station 120) and the electronic device 110 for wireless communication. BM can include beam measurements where signal qualities of signals (e.g., reference signals (RSs)) from the network 101 can be determined, for example, by the electronic device 110. BM can include beam reporting where the electronic device 110 can send information for the measured signal qualities and corresponding beam information to the network 101 (e.g., the base station 120). BM can include beam sweeping.

In some embodiments, beam pairs 171-175 are formed between the electronic device 110 and the network 101 using the Tx beams Tx1-Tx5 and the Rx beams Rx1-Rx5, respectively. The beam pairs 171-175 can include the serving beam pair 173 and candidate beam pairs 171, 172, 174, and 175.

Beam measurements for the beam pairs 171-175 can be implemented, for example, to determine signal qualities (or link qualities) of the beam pairs 171-175. In an example, when the signal quality of the serving beam pair 173 is deteriorated, one of the candidate beam pairs can be used as a new serving beam pair. Beam measurements can consume a larger amount of power, for example, when a carrier frequency is high (e.g., in a frequency range 2 (FR2)) as compared with a case when the carrier frequency is low (e.g., in a frequency range 1 (FR1)).

According to aspects of the disclosure, a RS from the network 101 can be received via the serving beam pair 173 used for the DL transmission between the network 101 and the electronic device 110. As described above, the serving beam pair 173 can include the serving Tx beam Tx3 transmitted from the network 101 and the serving Rx beam Rx3 received by the electronic device 110. A signal quality of the RS transmitted via the serving beam pair 173 can be determined, and thus referred to as a serving signal quality. The signal quality (or the serving signal quality) of the RS can indicate a link quality of the serving beam pair 173. The signal quality can indicate a signal strength of the RS. When the signal quality is determined to satisfy a power saving condition (e.g., the signal quality is larger than a threshold), beam measurements for the beam pairs 171-175 can be reduced to decrease power consumption that the electronic device 110 spends in BM. The signal quality can include a reference signal received power (RSRP), a signal to noise ratio (SNR), a signal to interference and noise ratio (SINR), and a reference signal received quality (RSRQ), or the like. The power saving condition can indicate that the signal quality remains larger than a first quality for a first consecutive number of times where the first quality can be one of: 1) a first threshold and 2) a sum of a second threshold and a candidate signal quality determined based on one or more of the candidate beam pairs 171, 172, 174, and 175.

In an example, the communication system 100 can be a fifth generation (5G) system (5GS), the network 101 includes a 5G radio access network (RAN) (or Next Generation (NG) RAN) and a 5G core network (5GC) that uses 5G mobile network technology. The base station 120 is a next generation Node B (gNB) specified in 5G new radio (NR) air interface standards developed by 3rd Generation Partnership Project (3GPP).

The network 101 can include various base stations, such as the base station 120 and a base station 129, and core nodes that are interconnected using any suitable network technology, such as wired, wireless, a cellular communication technology, a local area network (LAN), a wireless LAN (WLAN), a fiber optical network, a wide area network (WAN), a peer-to-peer network, the Internet, and the like. In some embodiments, the network 101 provides wireless communication service to electronic devices, such as the electronic device 110, using any suitable wireless communication technology, such as second generation (2G), third generation (3G), and fourth generation (4G) mobile network technologies, 5G mobile network technology, global system for mobile communication (GSM), long-term evolution (LTE) technologies, NR technologies, and the like. In some examples, the network 101 employs wireless communication technologies developed by 3GPP. In an example, the base stations in the network 101 form one or more access networks and the core nodes form one or more core networks. An access network can be a RAN, such as a 5G RAN or NG RAN, an Evolved Universal Terrestrial Radio Access (E-UTRA), and the like. A core network can be an evolved packet core (EPC), a 5GC, and the like.

In various examples, a base station (e.g., the base station 120, the base station 129) can be referred to as a Node B, an evolved Node B, a gNB, and the like. In an example, the base stations 120 and 129 are gNBs specified in 5G NR air interface standards developed by 3GPP. The base stations 120 and 129 include hardware components and software components configured to enable wireless communications between the base stations 120 and 129 and the electronic device 110, respectively. Further, the core nodes include hardware components and software components to form a backbone to manage and control the services provided by the network 101.

In some embodiments, the electronic device 110 and the network 101 are configured to deploy carrier aggregation (CA) and/or dual connectivity (DC) to enhance a throughput (e.g., a data rate, a bandwidth) of the electronic device 110. In an example, CA is employed by the communication system 100, and a cell group (e.g., including a PCell and SCell(s)) is configured for the electronic device 110 to communicate with the base station 120. A plurality of the carriers can be aggregated and transmitted in parallel to/from the electronic device 110 in CA, and thus increasing a data rate. Embodiments in the disclosure can be implemented with CA, without CA, with DC, without DC, or any combination thereof.

Any suitable carrier frequencies (e.g., carrier frequencies less than 6 giga-Hertz (GHz), at 6 GHz, or above 6 GHz) can be used in the communication system 100. Carrier frequencies less than 6 GHz can be referred to as low frequencies, such as between 600 MHz to less than 6 GHz. For example, the FR1 includes frequencies below 6 GHz. As described above, high frequencies can be used as carrier frequencies to increase a network capacity (e.g., a data rate, a bandwidth). In an example, the high frequencies are higher than 6 GHz, such as between 24-84 GHz. The FR2 can include frequencies in the range 24.25-52.6 GHz. For certain signals (e.g., FR2 signals or FR1 signals), a base station (e.g., the base station 120) and the electronic device 110 can perform beamformed transmission and/or reception to reduce effects of propagation loss and blockage.

In general, a beam is allocated with radio resources including a set of time and/or frequency resources. In beamformed transmission, signal energy can be focused predominantly toward a specific direction, such as the direction 183 associated with Tx3. As a result, an increased antenna transmission gain can be achieved in contrast to omnidirectional antenna transmission. Similarly, in beamformed reception, signal energy received predominantly from a specific direction can be combined to obtain a higher antenna reception gain in contrast to omnidirectional antenna reception, such as the direction 193 associated with Rx3. Therefore, the beam can be associated with a direction indicating a dominant propagation direction of signal energy of the beam, and thus can be referred to as a directional beam. For example, in the cell 170, the beams Tx2-Tx3 transmitted from the base station 120 mainly propagate along the directions 182-183, respectively.

In some embodiments, a beam can refer to a signal or a channel transmitted from or received by the electronic device 110 or the base station 120. A beam transmitted from the electronic device 110 along a direction can be referred to as an UL Tx beam and the direction can be referred be as an UL Tx direction. A beam received by the electronic device 110 from a direction can be referred to as a DL Rx beam (e.g., Rx3) and the direction can be referred be as a DL Rx direction (e.g., 193). As described above, a beam transmitted from the network 101 (e.g., the base station 120) along a direction can be referred to as a DL Tx beam (e.g., Tx3) and the direction can be referred be as a DL Tx direction (e.g., 183). A beam received by the base station 120 from a direction can be referred to as an UL Rx beam and the direction can be referred be as an UL Rx direction.

A DL beam pair (e.g., the serving beam pair 173) for the DL communication can be formed using a DL Tx beam (e.g., Tx3) and a DL Rx beam (e.g., Rx3). An UL beam pair for the UL communication from the electronic device 110 to the base station 120 can be formed using an UL Tx beam and an UL Rx beam. In an embodiment, beam directions in the DL beam pair correspond to beam directions in the UL beam pair, for example, when the electronic device 110 is configured with beam correspondence, and thus an UL Tx direction is opposite to a DL Rx direction, and an UL Rx direction is opposite to a DL Tx direction.

A base station (e.g., the base stations 120) can be configured to control one or more antenna arrays to form directional beams for transmitting or receiving signals. The directional beams can be generated/received simultaneously or in different time intervals.

In an example, the electronic device 110 is a terminal device (e.g., user equipment) for wireless communication, such as a cell phone, a mobile phone, a smart phone, a tablet computer, a laptop computer, a smart device, a wearable device, a device carried in a vehicle, and the like. The electronic device 110 can employ one or more antenna arrays to generate directional Tx or Rx beams for transmitting or receiving wireless signals (e.g., FR1, FR2), respectively. The electronic device 110 can also include suitable transceivers and antennas that transmit and receive omnidirectional wireless signals (e.g., FR1).

Referring to FIG. 1A, the electronic device 110 can include a transceiver 130, processing circuitry 150, and memory 146 that are coupled together, for example, using a bus 145. The transceiver 130 is configured to receive and transmit wireless signals. In some embodiments, the transceiver 130 is configured to receive various RSs transmitted from the network 101 (e.g., the base station 120). The RSs can include RS(s) sent using the serving beam pair 173 and RS(s) sent using the candidate beam pairs 171, 172, 174, and 175. RSs can include CSI-RS(s) and synchronization signal block(s) (SSBs). In some embodiments, an SSB is formed with a primary synchronization signal (PSS), a secondary synchronization signal (SSS), and a Physical Broadcast Channel (PBCH). Signal qualities (or beam qualities) of the RSs can be measured and used in BM. The transceiver 130 can send beam reporting to the network 101 (e.g., the base station 120). The beam reporting can indicate the signal qualities of the RSs and corresponding beam information (e.g., SSB index or indices).

Referring to FIGS. 1A-1B, when the signal quality of the serving beam pair 173 is deteriorated below a certain quality (e.g., the first signal quality), for example, due to movement of the electronic device 110 or blockage, one of the candidate beam pairs 171, 172, 174, and 175 can be used to transmit control/user data from the base station 120 to the electronic device 110, and thus can be used as a new serving beam pair.

The processing circuitry 150 can be configured to implement BM including beam sweeping, beam measurements, beam reporting, and the like. Beam measurements can include determining signal qualities of the RSs received, for example, over the beam pairs 171-175, respectively. The signal quality of the RS transmitted over the serving beam pair 173 can indicate the link quality of the serving beam pair 173. The signal qualities of the RSs transmitted over the candidate beam pairs 171, 172, 174, and 175 can indicate link qualities of the respective candidate beam pairs 171, 172, 174, and 175.

The signal qualities of the RSs can be measured using any suitable methods and in any suitable layer. The signal qualities can include RSRP(s), SNR(s), SINR(s), and RSRQ(s), and/or the like. Beam measurements can be implemented in layer 1 (L1) (or physical layer), layer 3 (L3) (or radio resource control (RRC) layer)), and/or the like, and thus can be referred to as L1 beam measurements, L3 beam measurements, and/or the like. In an example, the signal qualities include L1-RSRPs and/or L1-SINRs from the L1 beam measurements. L1-RSRPs can be obtained based on SSB(s), CSI-RS(s), and/or the like.

Beam reporting can include reporting one or more of the signal qualities (e.g., RSRPs, L1-RSRPs, RSRQs, SNRs, SINRs, L1-SINRs) determined by the processing circuitry 150 to the network 101. The RS(s) can be reported using beam index or indices (e.g., SSB index or indices).

Figure 2:
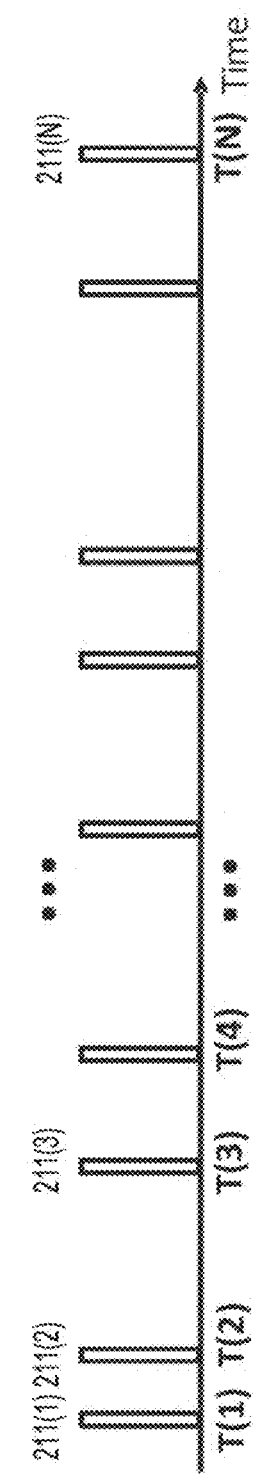
FIG. 2 shows an example of beam measurements in a time domain according to an embodiment of the disclosure.
Figure 3A:
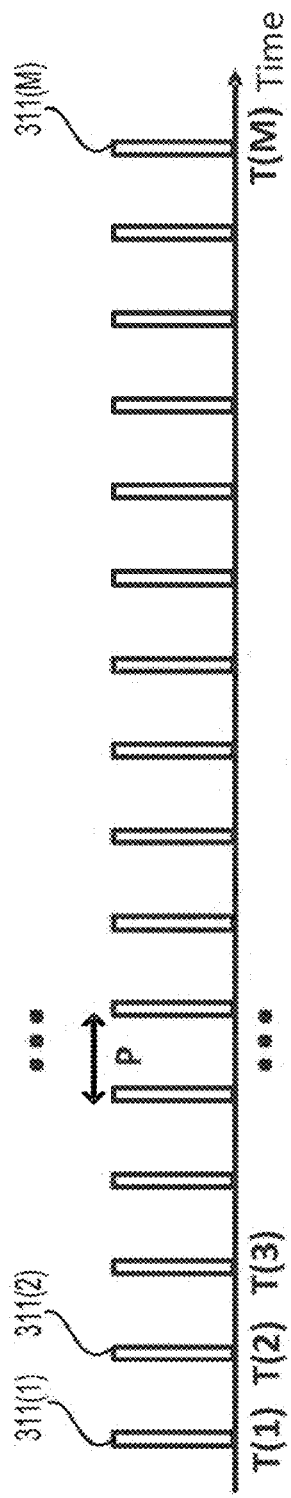
FIGS. 3A-3C show examples of reducing beam measurements in a time domain according to embodiments of the disclosure.

FIG. 2 shows an example of beam measurements in a time domain according to an embodiment of the disclosure. The beam measurements 211(1)-211(N) are made at times T(1)-T(N), respectively. N can be larger than 1. One of the beam measurements 211(1)-211(N) can include determining signal qualities for beam pair(s) (e.g., the beam pairs 171-175) configured between the electronic device 110 and the base station 120. The beam measurements can be periodic (e.g., as shown in FIG. 3A) or aperiodic (e.g., as shown in FIG. 2).

Referring back to FIG. 1A, according to aspects of the disclosure, to reduce power consumption due to beam measurements, when the link quality (or the signal quality) of the serving beam pair 173 satisfies the power saving condition, the processing circuitry 150 can reduce beam measurements for the beam pairs 171-175, and thus can implement the beam measurements with power saving (PS) (or the PS beam measurements). The power saving condition can include that the signal quality of the RS transmitted over the serving beam pair 173 remains larger than the first quality for the first consecutive number of times (e.g., 1, 2, 3, or the like). The first quality can be the first threshold, the sum of the second threshold and the candidate signal quality determined based on the one or more of the candidate beam pairs 171, 172, 174, and 175. The first threshold, the second threshold, and/or the first consecutive number of times can be fixed or preconfigured. Alternatively, the first threshold, the second threshold, and/or the first consecutive number of times can be signaled from the network 101 to the electronic device 110 and received by the transceiver 130.

The candidate signal quality can be the best signal quality in the signal qualities of the candidate beam pairs 171, 172, 174, and 175. For example, the candidate signal quality corresponds to a largest signal strength, a largest signal power (e.g., largest RSRP), a largest SNR, a largest RSRP, a largest SINR, or the like in the signal qualities of the candidate beam pairs 171, 172, 174, and 175. In an example, the candidate signal quality is the best signal quality in a subset of the signal qualities of the candidate beam pairs 171, 172, 174, and 175. For example, the candidate signal quality corresponds to a largest signal strength, a largest signal power (e.g., largest RSRP), a largest SNR, a largest RSRP, a largest SINR, or the like in the subset of the signal qualities of the candidate beam pairs 171, 172, 174, and 175.

Referring again to FIG. 1B, according to aspects of the disclosure, the processing circuitry 150 can reduce the beam measurements in a spatial domain by performing the beam measurements for a subset of the beam pairs 171-175, while not performing the beam measurements for a remaining subset of the beam pairs 171-175. Thus, a number of the beam pairs 171-175 to be measured is reduced. In an example, the subset being measured includes the serving beam pair 173. In an example, the subset being measured includes the serving beam pair 173 and any suitable candidate beam pair(s) in the beam pairs 171-175. A number of the subset of the beam pairs 171-175 is less than a number of the beam pairs 171-175. Referring to FIG. 1B, the subset being measured can include the beam pairs 172-174, and the remaining subset not being measured can include the beam pairs 171 and 175. Thus, the processing circuitry 150 can reduce a number of beam pairs to be measured in the spatial domain, and thus reducing the power consumption of the beam measurements. In an example, the RSs being measured include CSI-RS(s) and/or SSB(s). The beam measurements include periodic beam measurements (e.g., periodic L1-RSRP measurements or periodic L1-SINR measurements). The processing circuitry 150 can perform the periodic beam measurements (e.g., the periodic L1-RSRP measurements or the periodic L1-SINR measurements) for the subset (e.g., the beam pairs 172-174) of the beam pairs 171-175 while not performing the periodic beam measurements (e.g., the periodic L1-RSRP measurements or the periodic L1-SINR measurements) for the remaining subset (e.g., the beam pairs 171 and 175).

Referring to FIG. 2, according to aspects of the disclosure, the processing circuitry 150 can reduce the beam measurements in the time domain, and thus a number of beam measurements in a given duration can be reduced. In an embodiment, the processing circuitry 150 can skip the beam measurements and corresponding beam reporting in the time domain for a second consecutive number of times (e.g., 1, 2, 3, or the like). Thus, the processing circuitry 150 can implement PS beam reporting. For example, instead of performing the beam measurements 211(1)-211(N) at T(1)-T(N), respectively, the processing circuitry 150 can skip one or more of the beam measurements (e.g., 211(2)) at corresponding time(s) (e.g., at T(2)), and thus performing the beam measurements 211(1), 211(3), . . . , 211(N) at T(1), T(3), . . . , T(N), respectively.

In an example, the RSs include CSI-RS(s), SSB(s), and/or the like. Referring to FIG. 3A, the beam measurements include the periodic beam measurements (e.g., the periodic L1-RSRP measurements or the periodic L1-SINR measurements) 311(1)-311(M) performed at times T(1)-T(M), respectively. M can be larger than 1. A period of the periodic beam measurements 311(1)-311(M) is P. The power saving condition is that the signal quality of the RS transmitted over the serving beam pair 173 remains larger than the first quality for the first consecutive number of times.

When the signal quality is determined to remain larger than the first quality for the first consecutive number of times, the processing circuitry 150 can skip the periodic beam measurements and the corresponding beam reporting for the second consecutive number of times. Thus, the processing circuitry 150 can implement PS beam reporting. In an example shown in FIG. 3B, the first consecutive number of times is two and the second consecutive number of times is one. Thus, when the signal quality is determined to remain larger than the first quality for two times (e.g., at T(1) and T(2)), the processing circuitry 150 can skip the periodic beam measurements (e.g., the periodic L1-RSRP measurements or the periodic L1-SINR measurements) and the corresponding beam reporting for one time (e.g., the beam measurement 311(3) at a time T(3)). Similarly, the beam measurement 311(6) and the like can be skipped. As described above, the first quality can be the first threshold (e.g., a RSRP threshold, a SNR threshold, a RSRQ threshold, a SINR threshold). The first quality can be based on the second threshold (e.g., a RSRP threshold, a SNR threshold, a RSRQ threshold, a SINR threshold) and the candidate signal quality (e.g., a largest RSRP of the candidate beam pairs 171, 172, 174, and 175 or a largest SINR of the candidate beam pairs 171, 172, 174, and 175), for example, the first quality is the sum of the second threshold and the candidate signal quality.

The first consecutive number of times and the second consecutive number of times can be any suitable numbers. Referring to FIG. 3C, the first consecutive number of times is two and the second consecutive number of times is two. Thus, when the signal quality is determined to remain larger than the first quality for two times (e.g., at T(1) and T(2)), the processing circuitry 150 can skip the periodic beam measurements (e.g., the periodic L1-RSRP measurements or the periodic L1-SINR measurements) and the corresponding beam reporting for two times (e.g., beam measurements 311(3)-311(4) at times T(3) and T(4)). Similarly, the beam measurements 311(7), 311(8), and the like, can be skipped.

In an embodiment, the beam measurements include periodic beam measurements (e.g., periodic L1-RSRP measurements or periodic L1-SINR measurements). Referring to FIG. 4A, according to aspects of the disclosure, the processing circuitry 150 can reduce the beam measurements in the time domain by increasing a period of the periodic beam measurements and corresponding beam reporting from a first period P1 to a second period P2. P2 is longer than P1 and can be written as P2=C×P1, where C is a scaling factor larger than 1, such as 1.5, 2, or the like. Thus, the processing circuitry 150 can implement PS beam reporting.

In an example, the RSs include CSI-RS(s), SSB(s), and/or the like. The power saving condition is that the signal quality of the RS transmitted over the serving beam pair 173 remains larger than the first quality for the first consecutive number of times. The first consecutive number of times can be any suitable number. When the signal quality is determined to remain larger than the first quality for the first consecutive number of times, the processing circuitry 150 can increase the period of the periodic beam measurements from P1 to P2.

In an example shown in FIG. 4A, the first consecutive number of times is three and the scaling factor C is 2 (e.g., P2=2×P1). Thus, when the signal quality is determined to remain larger than the first quality for three times (e.g., at T(1), T(2), and T(3)), the processing circuitry 150 can increase the period of the periodic beam measurements and the corresponding beam reporting from P1 to 2P1.

As described above, the first quality can be the first threshold (e.g., a RSRP threshold, a SNR threshold, a RSRQ threshold, a SINR threshold). The first quality can be based on the second threshold (e.g., a RSRP threshold, a SNR threshold, a RSRQ threshold, a SINR threshold) and the candidate signal quality (e.g., a largest RSRP of the candidate beam pairs 171, 172, 174, and 175 or a largest SINR of the candidate beam pairs 171, 172, 174, and 175), for example, the first quality is the sum of the second threshold and the candidate signal quality.

Referring to FIG. 4B, the first consecutive number of times is two and the scaling factor C is 1.5 (e.g., P2=1.5× P1). Thus, when the signal quality is determined to remain larger than the first quality for two times (e.g., at T(1) and T(2)), the processing circuitry 150 can increase the period of the periodic beam measurements and the corresponding beam reporting from P1 to 1.5P1.

Referring to FIGS. 4A-4B, in some embodiments, when the period is the second period P2, the processing circuitry 150 can determine the signal quality of the RS sent using the serving beam pair 173. When the signal quality is determined not to be larger than a second quality, for example, at T(8) in FIG. 4A, at T(7) in FIG. 4B, or the like, the processing circuitry 150 can reduce the period from P2 to P1. The second quality can be identical to the first quality. Alternatively, the second quality can be different from the first quality.

Embodiments described above where the processing circuitry 150 can reduce the beam measurements (or implement PS beam measurements) in the spatial domain (e.g., as shown in FIG. 1B) and in the time domain (e.g., as shown in FIGS. 2, 3A-3C, and 4A-4B) can be suitably combined. Accordingly, the processing circuitry 150 can reduce the beam measurements by implementing at least one or a suitable combination of 1) reducing the beam measurements in the spatial domain by performing the beam measurements for a subset of the beam pairs 171-175 including the serving beam pair 173, while not performing the beam measurements for a remaining subset of the beam pairs 171-175; 2) skipping the beam measurements and corresponding beam reporting in the time domain for the second consecutive number of times; and 3) when the beam measurements include the periodic beam measurements, increasing the period of the periodic beam measurements and corresponding beam reporting from P1 to P2. Examples are given below.

In an embodiment, the processing circuitry 150 can reduce the beam measurements in the spatial domain and/or in the time domain. Referring to FIGS. 1B and 2, in an example, the processing circuitry 150 measures a subset (e.g., 172-174) of the beam pairs 171-175 at certain times (e.g., T(1), T(3), T(4), . . . ) while skipping the beam measurements at a remaining subset (T(2), . . . ) of times. In an example, the processing circuitry 150 measures the beam pairs 171-175 at certain times (e.g., T(1), T(3), T(4), . . . ) while measuring a subset (e.g., 172-174) of the beam pairs 171-175 at a remaining subset (T(2), . . . ) of times.

Figure 3B:
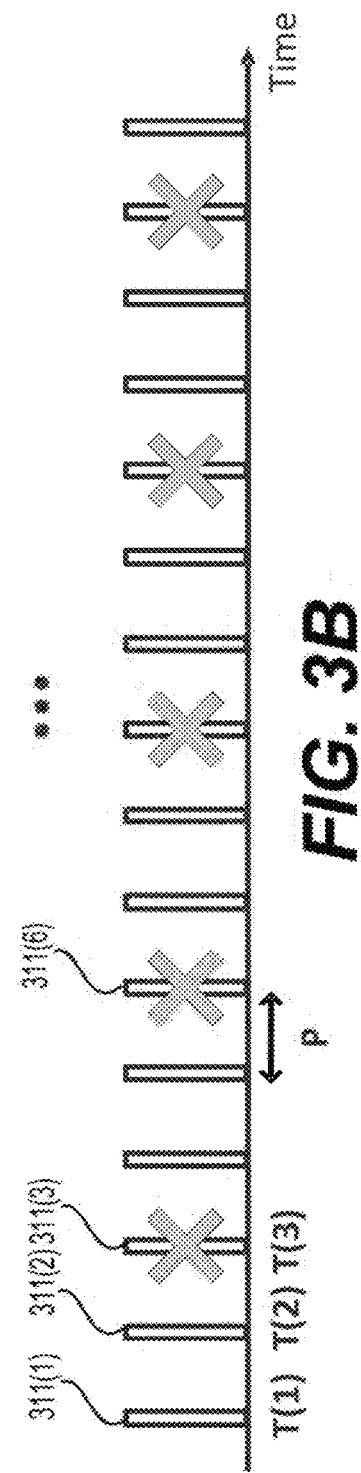
Figure 3C:
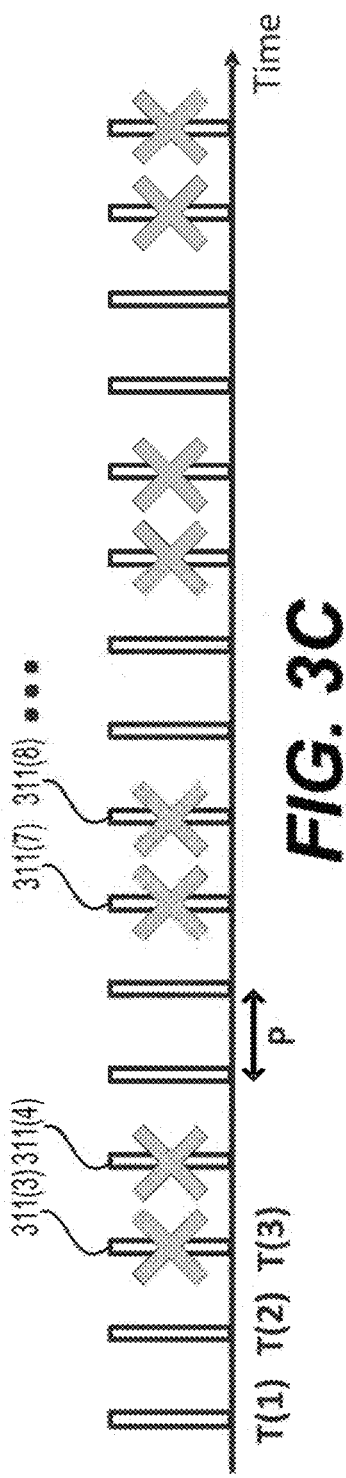

In an example, the beam measurements include the periodic beam measurements (e.g., the periodic L1-RSRP measurements where L1-RSRPs of RSs of the respective beam pairs 171-175 are measured, or the periodic L1-SINR measurements where L1-SINRs of RSs of the respective beam pairs 171-175 are measured) shown in FIGS. 3A-3B. The processing circuitry 150 can measure a subset (e.g., 172-174) of the beam pairs 171-175 at certain times (e.g., T(1), T(2), T(4), . . . ) while skipping the beam measurements at a remaining subset (T(3), . . . ) of times.

In an example, the beam measurements include the periodic beam measurements (e.g., the periodic L1-RSRP measurements or the periodic L1-SINR measurements). Referring to FIG. 4A, the processing circuitry 150 can increase the period of the periodic beam measurements and the corresponding beam reporting from P1 to P2 (e.g., 2P1), as described above. When the period is P1, the processing circuitry 150 can measure the beam pairs 171-175. When the period is P2, the processing circuitry 150 can further reduce the beam measurements in the spatial domain by measuring a subset (e.g., 172-174) of the beam pairs 171-175 while not performing the beam measurements for a remaining subset (e.g., 171 and 175) of the beam pairs 171-175.

Referring again to FIG. 4A, the beam measurements in the spatial domain are reduced when the period is P1 and when the period is P2. Accordingly, when the period is P1 and when the period is P2, the processing circuitry 150 can reduce the beam measurements in the spatial domain by measuring a subset (e.g., 172-174) of the beam pairs 171-175 while not performing the beam measurements for a remaining subset (e.g., 171 and 175) of the beam pairs 171-175.

Referring again to FIG. 4A, the beam measurements in the spatial domain are reduced when the period is P1. Accordingly, when the period is P1, the processing circuitry 150 can reduce the beam measurements in the spatial domain by measuring a subset (e.g., 172-174) of the beam pairs 171-175 while not performing the beam measurements for a remaining subset (e.g., 171 and 175) of the beam pairs 171-175. When the period is P2, the processing circuitry 150 can measure the beam pairs 171-175.

In general, the processing circuitry 150 can reduce the beam measurements in the spatial domain and/or in the time domain by using the embodiments disclosed in the disclosure or suitably adapting the embodiments disclosed in the disclosure.

In various embodiments, BM in NR FR2 can consume a larger amount of power as compared to BM in FR1. Thus, power saving for the electronic device 110 (e.g., UE) in NR FR2 can be important. In an example, power consumptions of the electronic device 110 are estimated using a File Transfer Protocol (FTP) 3 traffic model (also referred to as a FTP model 3) without Wake-up Signal (WUS) for FR1 and FR2, respectively. For example, the power consumptions are estimated to be 127.61 (arbitrary unit (AU)) and 52.33 AU for FR2 and FR1, respectively. BM using SSB and CSI-RS processing can consume a large portion of power in FR2 compared to FR1. In an example, when a cell (e.g., the cell 170) enters a dormant state without PDCCH or PDSCH reception, BM power consumption can be a dominant part. Table 1 shows an example of power consumptions of various power states in FR2. In Table 1, a CSI-RS length can be 2 slots (executed per 160 milliseconds (ms)), and a SSB burst length can be 5 ms (40 slots, executed per 160 ms).

TABLE 1

Power consumptions of various power states in FR2

| Power State | Power consumption |
|---|---|
| PDCCH-only | 34.7% |
| PDSCH | 27.95% |
| Sleep | 18.04% |
| SSB & CSI-RS processing | 14.07% |

As described above, the processing circuitry 150 can be configured to implement BM with power saving (PS). The BM with PS can include PS beam measurements in the spatial domain and/or the time domain. The processing circuitry 150 can be implemented using various techniques, such as integrated circuits, one or more processors executing software instructions, and the like.

The memory 146 can be any suitable device for storing data and instructions for BM with power saving. In an example, the memory 146 stores the signal qualities determined by the processing circuitry 150, the beam report, the first quality, the second quality, the first threshold, the second threshold, periods (e.g., P, P1, P2), the first consecutive number of times, the second consecutive number of times, and software instructions to be executed by a processor, such as the processing circuitry 150.

In an embodiment, the memory 146 can be non-volatile memory, such as read-only memory, flash memory, magnetic computer storage devices, hard disk drives, solid state drives, floppy disks, and magnetic tape, optical discs, and the like. In an embodiment, the memory 146 can be a random access memory (RAM). In an embodiment, the memory 146 can include non-volatile memory and volatile memory.

Figure 5:
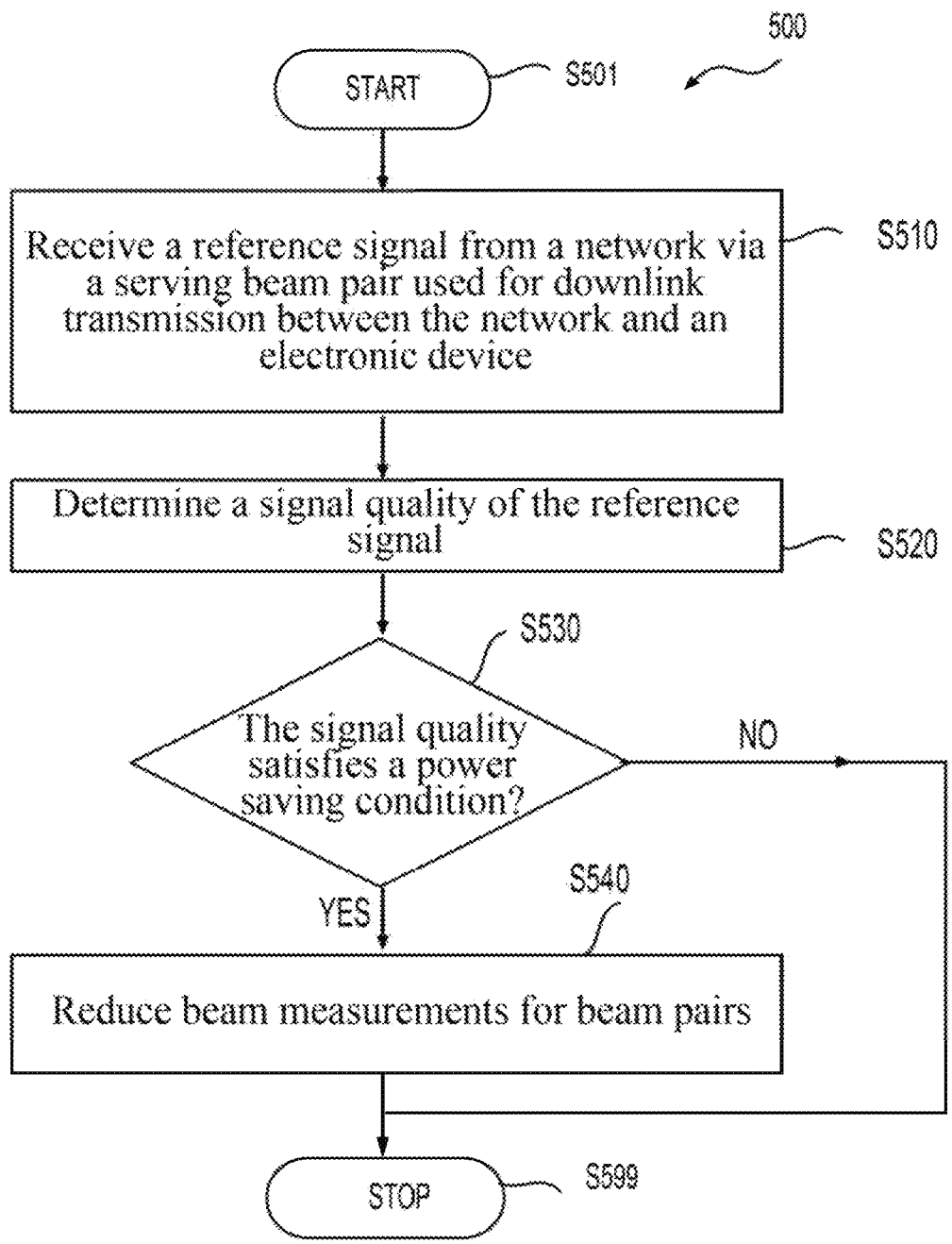
FIG. 5 shows an exemplary process 500 according to an embodiment of the disclosure.

FIG. 5 shows a flowchart of an exemplary process 500 according to an embodiment of the disclosure. The process 500 can be used to implement the BM with power saving described above. In an example, an electronic device (e.g., the electronic device 110) is configured to perform the process 500. As described above, beam pairs (e.g., the beam pairs 171-175) can be formed between the electronic device and a network (e.g., the network 101). The beam pairs (e.g., the beam pairs 171-175) can include a serving beam pair (e.g., the serving beam pair 173) and one or more candidate beam pairs (e.g., 171, 172, 174, and/or 175). The serving beam pair can be used for the DL transmission from the network to the electronic device (e.g., PDCCH, PDSCH, and/or a CSI-RS transmission). The process 500 starts at S501, and proceeds to S510.

At S510, a RS from the network transmitted via the serving beam pair (e.g., the serving beam pair 173) used for the DL transmission can be received. As described above, the serving beam pair can include a serving Tx beam (e.g., Tx3) transmitted from the network and a serving Rx beam (e.g., Rx3) received by the electronic device.

At S520, a signal quality of the RS transmitted via the serving beam pair can be determined. The signal quality can include a RSRP (e.g., a L1-RSRP), a RSRQ, a SNR, a SINR (e.g., L1-SINR), or the like, as described above. The signal quality can indicate a link quality of the serving beam pair.

At S530, whether the signal quality determined at S520 satisfies a power saving condition can be determined. As described above, the power saving condition can indicate that the signal quality remains larger than the first quality for the first consecutive number of times. The first quality can be the first threshold, a sum of the second threshold and a candidate signal quality determined based on the one or more candidate beam pairs between the electronic device and the network, or the like, as described above. One or more candidate signal qualities (e.g., RSRP(s), such as L1-RSRP(s), SINR(s), such as L1-SINR(s), RSRQ(s), SNR(s)) can be determined for the one or more candidate beam pairs, and can be used to determine the candidate signal quality. The candidate signal quality can be a best of the one or more candidate signal qualities, such as a largest RSRP of the RSRP(s), a largest L1-RSRP of the L1-RSRP(s), a largest RSRQ of the RSRQ(s), a largest SNR of the SNR(s), a largest SINK of the SINR(s), a largest L1-SINR of the L1-SINR(s), or the like.

In an example, the power saving condition is that the signal quality remains larger than the first threshold for the first consecutive number of times. In an example, the power saving condition is that the signal quality remains larger than the sum of the second threshold and the candidate signal quality for the first consecutive number of times. In an example, the power saving condition is that the signal quality remains larger than a subset of the one or more candidate signal qualities by a certain threshold.

When the signal quality is determined to satisfy the power saving condition, the process 500 proceeds to S540. Otherwise, the process proceeds to S599.

At S540, beam measurements for the beam pairs can be reduced. The beam measurements can be reduced in the time domain (e.g., as shown in FIGS. 2, 3A-3C, and 4A-4B), in the spatial domain (e.g., as shown in FIG. 1B), or in a suitable combination in the time domain and in the spatial domain, as described above. Accordingly, the power saving beam measurements (or the beam measurements with power saving) are implemented.

The embodiments described herein can be implemented as a computer program which, when executed by one or more processors, can cause the one or more processors to perform the respective embodiments. The computer program may be stored or distributed on a suitable medium (e.g., the memory 146), such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a RAM, a ROM, a magnetic disk and an optical disk, and the like. The computer-readable non-transitory storage medium can include all types of computer readable medium, including magnetic storage medium, optical storage medium, flash medium and solid state storage medium.

The various circuitry, circuits, components, modules, and the like in the present disclosure can be implemented using any suitable technology, such as an integrated circuit (IC), ICs, digital signal processors (DSPs), microprocessors, CPUs, field programmable gate arrays, (FPGAs), Application-specific integrated circuits (ASICs), and the like. In an example, the various circuitry, components, modules, and the like can also include one or more processing circuits executing software instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for beam management (BM) with power saving, comprising:
   receiving a reference signal from a network via a serving beam pair used for downlink (DL) transmission between the network and an electronic device, the serving beam pair including a serving transmission (Tx) beam transmitted from the network and a serving reception (Rx) beam received by the electronic device;
   determining a signal quality of the reference signal; and
   when the signal quality is determined to satisfy a power saving condition, reducing, in (i) a spatial domain and/or (ii) a time domain, beam measurements in the BM for beam pairs including Tx beams transmitted from the network and respective Rx beams received by the electronic device, the beam pairs including the serving beam pair and one or more candidate beam pairs, wherein
   reducing the beam measurements in the spatial domain includes performing the beam measurements for a subset of the beam pairs including the serving beam pair, while not performing the beam measurements for a remaining subset of the beam pairs, a number of the subset of the beam pairs being less than a number of the beam pairs, the subset of the beam pairs including different Tx beams, and
   reducing the beam measurements in the time domain includes:
      skipping the beam measurements and corresponding beam reporting in the time domain for a first consecutive number of times; or
      increasing a period of periodic beam measurements and corresponding beam reporting from a first period P1 to a second period P2 that is longer than P1 when the beam measurements include the periodic beam measurements.

2. The method according to claim 1, wherein:
   the signal quality includes one of: a reference signal received power (RSRP), a signal to noise ratio (SNR), a signal to interference and noise ratio (SINR), and a reference signal received quality (RSRQ), and
   the power saving condition is that the signal quality remains larger than a first quality for a second consecutive number of times, the first quality being one of: 1) a first threshold and 2) a sum of a second threshold and a candidate signal quality determined based on the one or more candidate beam pairs.

3. The method according to claim 2, wherein reducing the beam measurements in (i) the spatial domain and/or (ii) the time domain further comprises:
   reducing the beam measurements in the spatial domain.

4. The method according to claim 3, wherein
   the reference signal includes a channel-state information reference signal (CSI-RS) or a synchronization signal block (SSB),
   the beam measurements include periodic layer 1 (L1) RSRP (L1-RSRP) measurements or periodic L1 SINR (L1-SINR) measurements, and
   reducing the beam measurements in the spatial domain includes performing the periodic L1-RSRP measurements or the periodic L1-SINR measurements for the subset of the beam pairs.

5. The method according to claim 2, wherein reducing the beam measurements in (i) the spatial domain and/or (ii) the time domain further comprises skipping the beam measurements and the corresponding beam reporting in the time domain for the first consecutive number of times.

6. The method according to claim 5, wherein
   the reference signal includes a channel-state information reference signal (CSI-RS) or a synchronization signal block (SSB),
   the beam measurements include periodic layer 1 (L1) RSRP (L1-RSRP) measurements or periodic L1 SINR (L1-SINR) measurements, and
   skipping the beam measurements includes skipping 1) the periodic L1-RSRP measurements or the periodic L1-SINR measurements and 2) the corresponding beam reporting for the first consecutive number of times.

7. The method according to claim 2, wherein
   the beam measurements include the periodic beam measurements; and
   reducing the beam measurements in (i) the spatial domain and/or (ii) the time domain includes increasing the period of the periodic beam measurements and the corresponding beam reporting from the first period P1 to the second period P2.

8. The method according to claim 7, further comprising:
determining the signal quality of the reference signal when the period is the second period P2; and
when the signal quality is determined not to be larger than the first quality, reducing the period from P2 to P1.

9. The method according to claim 8, wherein
the reference signal includes a channel-state information reference signal (CSI-RS) or a synchronization signal block (SSB), and
the periodic beam measurements include periodic layer 1 (L1) RSRP (L1-RSRP) measurements or periodic L1 SINR (L1-SINR) measurements.

10. The method according to claim 2, further comprising:
measuring at least one candidate signal quality based on the one or more candidate beam pairs; and
determining the candidate signal quality being the largest of the at least one candidate signal quality.

11. An electronic device for beam management (BM) with power saving, comprising:
processing circuitry configured to:
receive a reference signal from a network via a serving beam pair used for downlink (DL) transmission between the network and an electronic device, the serving beam pair including a serving transmission (Tx) beam transmitted from the network and a serving reception (Rx) beam received by the electronic device;
determine a signal quality of the reference signal; and
when the signal quality is determined to satisfy a power saving condition, reduce, in (i) a spatial domain and/or (ii) a time domain, beam measurements in the BM for beam pairs including Tx beams transmitted from the network and respective Rx beams received by the electronic device, the beam pairs including the serving beam pair and one or more candidate beam pairs, wherein
reducing the beam measurements in the spatial domain includes performing the beam measurements for a subset of the beam pairs including the serving beam pair, while not performing the beam measurements for a remaining subset of the beam pairs, a number of the subset of the beam pairs being less than a number of the beam pairs, the subset of the beam pairs including different Tx beams, and
reducing the beam measurements in the time domain includes:
skipping the beam measurements and corresponding beam reporting in the time domain for a first consecutive number of times; or
increasing a period of periodic beam measurements and corresponding beam reporting from a first period P1 to a second period P2 that is longer than P1 when the beam measurements include the periodic beam measurements.

12. The electronic device according to claim 11, wherein:
the signal quality includes one of: a reference signal received power (RSRP), a signal to noise ratio (SNR), a signal to interference and noise ratio (SINR), and a reference signal received quality (RSRQ), and
the power saving condition is that the signal quality remains larger than a first quality for a second consecutive number of times, the first quality being one of: 1) a first threshold and 2) a sum of a second threshold and a candidate signal quality determined based on the one or more candidate beam pairs.

13. The electronic device according to claim 12, wherein the processing circuitry is further configured to:
reduce the beam measurements in the spatial domain.

14. The electronic device according to claim 13, wherein
the reference signal includes a channel-state information reference signal (CSI-RS) or a synchronization signal block (SSB),
the beam measurements include periodic layer 1 (L1) RSRP (L1-RSRP) measurements or periodic L1 SINR (L1-SINR) measurements, and
the processing circuitry is further configured to perform the periodic L1-RSRP measurements or the periodic L1-SINR measurements for the subset of the beam pairs.

15. The electronic device according to claim 12, wherein the processing circuitry is further configured to skip the beam measurements and the corresponding beam reporting in the time domain for the first consecutive number of times.

16. The electronic device according to claim 15, wherein
the reference signal includes a channel-state information reference signal (CSI-RS) or a synchronization signal block (SSB),
the beam measurements include periodic layer 1 (L1) RSRP (L1-RSRP) measurements or periodic L1 SINR (L1-SINR) measurements, and
the processing circuitry is further configured to skip 1) the periodic L1-RSRP measurements or the periodic L1-SINR measurements and 2) the corresponding beam reporting for the first consecutive number of times.

17. The electronic device according to claim 12, wherein
the beam measurements include the periodic beam measurements; and
the processing circuitry is further configured to increase the period of the periodic beam measurements and the corresponding beam reporting from the first period P1 to the second period P2.

18. The electronic device according to claim 17, wherein the processing circuitry is further configured to:
determine the signal quality of the reference signal when the period is the second period P2; and
when the signal quality is determined not to be larger than the first quality, reduce the period from P2 to P1.

* * * * *